United States Patent [19]
Finotello et al.

[11] Patent Number: 5,661,728
[45] Date of Patent: Aug. 26, 1997

[54] DECODER FOR AUDIO SIGNALS OF COMPRESSED AND CODED AUDIOVISUAL STREAMS

[75] Inventors: Andrea Finotello, Settimo Torinese; Maurizio Paolini, Valenza, both of Italy

[73] Assignee: SIP - Societa Italiana per l'Esercizio Delle Telecomunicazioni P.A., Turin, Italy

[21] Appl. No.: 548,297

[22] Filed: Nov. 1, 1995

[30] Foreign Application Priority Data

Dec. 23, 1994 [IT] Italy ................... TO94A1065

[51] Int. Cl.$^6$ ........................................... H04J 3/06
[52] U.S. Cl. .................. 370/503; 370/509; 348/423; 348/512; 348/515
[58] Field of Search ................ 370/94.1, 94.2, 370/99, 84, 100.1, 105.1, 105.2, 105.4, 106, 108, 110.1, 503, 509, 510, 511, 512, 513, 514, 515, 516, 517, 518, 519, 520, 522, 565, 470, 471, 473; 375/355, 362, 365, 368, 376; 348/423, 466, 473, 512, 515, 513

[56] References Cited

U.S. PATENT DOCUMENTS

| | | | |
|---|---|---|---|
| 5,396,497 | 3/1995 | Veltman | 370/100.1 |
| 5,430,485 | 7/1995 | Lankford et al. | 348/515 |
| 5,533,021 | 7/1996 | Branstad et al. | 370/94.2 |
| 5,537,409 | 7/1996 | Moriyama | 370/94.2 |
| 5,543,853 | 8/1996 | Haskell et al. | 348/466 |

*Primary Examiner*—Wellington Chin
*Assistant Examiner*—Huy D. Vu
*Attorney, Agent, or Firm*—Herbert Dubno

[57] ABSTRACT

A decoder for audio signals belonging to audio-visual streams coded in accordance with standard ISO/IEC 11172 is provided. The decoder has a presentation unit (UP) which is controlled by a first and a second clock signal, depending on the desired sampling rate, and is associated to device for (SAV) managing audio-video synchronization. The latter device starts the presentation of output data by comparing a first timing signal (SCR), representative of a system clock signal, and a second timing signal (PTS), representative of a correct instant of data presentation, independently generate the two clock signals (CLK24, CLK22) and corrects the signal corresponding to the desired sampling rate with the use of a feedback circuit which includes a digital filter (FD).

4 Claims, 10 Drawing Sheets

DECODER FOR AUDIO SIGNALS OF COMPRESSED AND CODED AUDIOVISUAL STREAMS

FIELD OF THE INVENTION

The present invention relates to processing systems for digitized audio and video signals and, more particularly to a decoder for audio signals belonging to digital audio-visual streams coded in accordance with the ISO/IEC 11172 (or ISO/MPEG-1) standard. To keep the description simple, hereinafter reference shall be made to the "MPEG standard" and "MPEG streams".

BACKGROUND OF THE INVENTION

The MPEG standard is a standard for the representation of compressed and coded audio and video data for allowing a data exchange between compatible terminals and offering normalized decoding methodologies. The standard provides for an organization of the compressed and coded data that is oriented to the transmission of packets. The organization is hierarchical, whereby a higher level (system layer) entails the transmission of a sequence of the so called audio-visual "packs", starting with a pack start code and a pack end code; the sequence ends with transmission of a sequence end code (ISO11172 end code). An immediately lower level (pack layer) determines the organization of the packs and prescribes that each of them comprises, after the start code, timing information, the so-called system header and a number of audio and video packets for one or more channels; each packet comprises a header with service information, and the actual data. When decoding takes place, the different types of packets present in a pack are demultiplexed and then decoded separately, by exploiting the service information present in the packs (start code, synchronization information and system header) and in the packet headers.

In the case of audio signals, which is the one of interest for the present invention, the data inserted into the packets are organized into audio frames comprising a fixed number of samples. Coding is a sub-band coding, the bit allocation to the different sub-bands being determined on the basis of suitable human perception models. During the decoding phase, in addition to recovering the original audio signal, it is also necessary to solve the problem of synchronization with pictures belonging to the same transmission. The problem is made particularly arduous by the fact that, according to the standard, audio data can be sampled at a certain number of rates, in particular 32 kHz, 44.1 kHz and 48 kHz, and the 44.1 kHz rate has no practically usable multiple in common with the other two rates.

A commercially available MPEG audio decoder directly generates the clock signal corresponding to the sampling rates of 32 and 48 kHz and obtains, from the latter, a second clock signal, related to the 44.1 kHz sampling rate, through the use of an accumulator which loads a fractional, user-programmable value, at each end-of-count of the counter generating said clock signal and which adds 1 to the count in progress when the accumulated value is more than one. This solution is not satisfactory because the correction is very abrupt and it cannot be tolerated by the output digital-to-analog converter, especially if the latter is of high quality. Moreover, the known device does not include any means for recovering possible phase shifts between the timing indications associated with the data stream (based on the clock signals generated by the encoder) and the clock signal generated by the decoder.

According to the invention, an audio decoder is provided instead wherein the correction of the second clock signal, too, is managed directly by the decoder, with no need to use external devices, and is performed in a smooth manner, and wherein, moreover, means are provided to recover any possible phase shift between the timing indications associated with the data stream and the clock signals generated by the decoder.

A decoder for audio signals belonging to audio-visual streams digitally coded in accordance with standard ISO/IEC 11172, such audio signals being inserted into packets comprising a packet header with a first group of service words, and data words composed of audio signal samples inserted into frames comprising a pre-set number of audio samples and a frame header with a second group of service words. The decoder (DA) comprising:

interface means (IS) for receiving audio packets and programming and synchronization information from external units (DS, CN), which manage the system layer of the standard;

a parser (AS) of the audio packets, which receives the packets from the interface means (IS), recognizes the correctness of the configuration and of the sequence of the service words in the first group, and forwards the data contained in the packets to subsequent units when a presentation time stamp (PTS) for those data is recognized in the first group of service words;

means (DFA) for decoding the audio stream, which receive from the parser (AS) the content of the data words of the packets and decode it by exploiting the service words in the second group;

means (RS) for searching and checking the audio data synchronism, on the basis of information supplied by the parser (AS) and by the means (DFA) for decoding the audio stream; and a presentation unit (UP) for supplying the decoded data to digital-to-analog conversion means, data presentation being possible with difference sampling rates which can be derived from at least a first and a second master frequency, the first master frequency being also utilized to generate an internal clock signal (CLK24) for the components of the decoder (DA).

The decoder (DA) can further comprise means (SAV) managing audio-video synchronization, which are arranged to:

start the presentation of the audio signals, by comparing a first timing signal (SCR), supplied by the interface means (IS) and representative of a system clock which also times depending and presentation of the video signals, and a second timing signal (PTS), taken from the stream of audio samples and consisting of same presentation time stamp, and generate, independently, a first or a second clock signal (CLK24, CLK22) for the correct presentation of the audio signals with a sampling rate derived from the first or respectively from the second master frequency, and control these clock signals by using a feedback circuit which comprises a digital filter (FN) and operates in such a way as to minimize the difference between the first timing signal (SCR) and the second one (PTS), the first clock signal for the presentation of the audio signals coinciding with the internal clock signal of the device.

The means (SAV) managing audiovideo synchronism can comprise:

means (ST1) for carrying out the comparison between the first and the second timing signals (SCR, PTS) and for providing a signal (DIFF) representative of the difference between said signals;

the digital filter (FN), which is a low-pass filter whose poles, zeros and gain can be programmed through the interface means (IS) and which is arranged to filter the difference signal (DIFF) supplied by the comparison means (ST1), if the value of this signal is within a pre-set interval, and to supply an error signal, when enabled by the data presentation unit (UP); and a first and a second phase locked loop, comprising respectively a first and a second voltage-controlled oscillator (VCO1, VCO2), which are controlled by said error signal through respective digital-to-analog converters (DAC1, DAC2) and are arranged to generate and send to the presentation unit (UP), respectively the first or the second clock signal (CLK24, CLK22) for data presentation, depending on the required sampling rate.

In an initialization phase of the decoder (DA), the filter (FN) provides the converters (DAC1, DAC2) with an error signal corresponding to the central value of the pre-set interval.

The presentation unit (UP) can comprise:

a data presentation register (RPD) for the serial emission of the decoded samples on a decoder output;

a first logic network (LC3) for controlling sample loading and emission by said register (RPD) and for generating synchronism signals (BCLK) for sample reading by utilization devices; and a second logic network (LC4) which generates and supplies to the first logic (LC3), on the basis of information on a data oversampling factor contained in the second group of service words, signals (LD, SHIFT, TWS) controlling data loading and shifting and the switching of the presentation channel, this second logic network (LC4) deriving said signals by processing the output signal of a counter (DCNT) whose counting capacity is equal to the capacity of said register (RP) multiplied by a maximum value of the oversampling factor.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
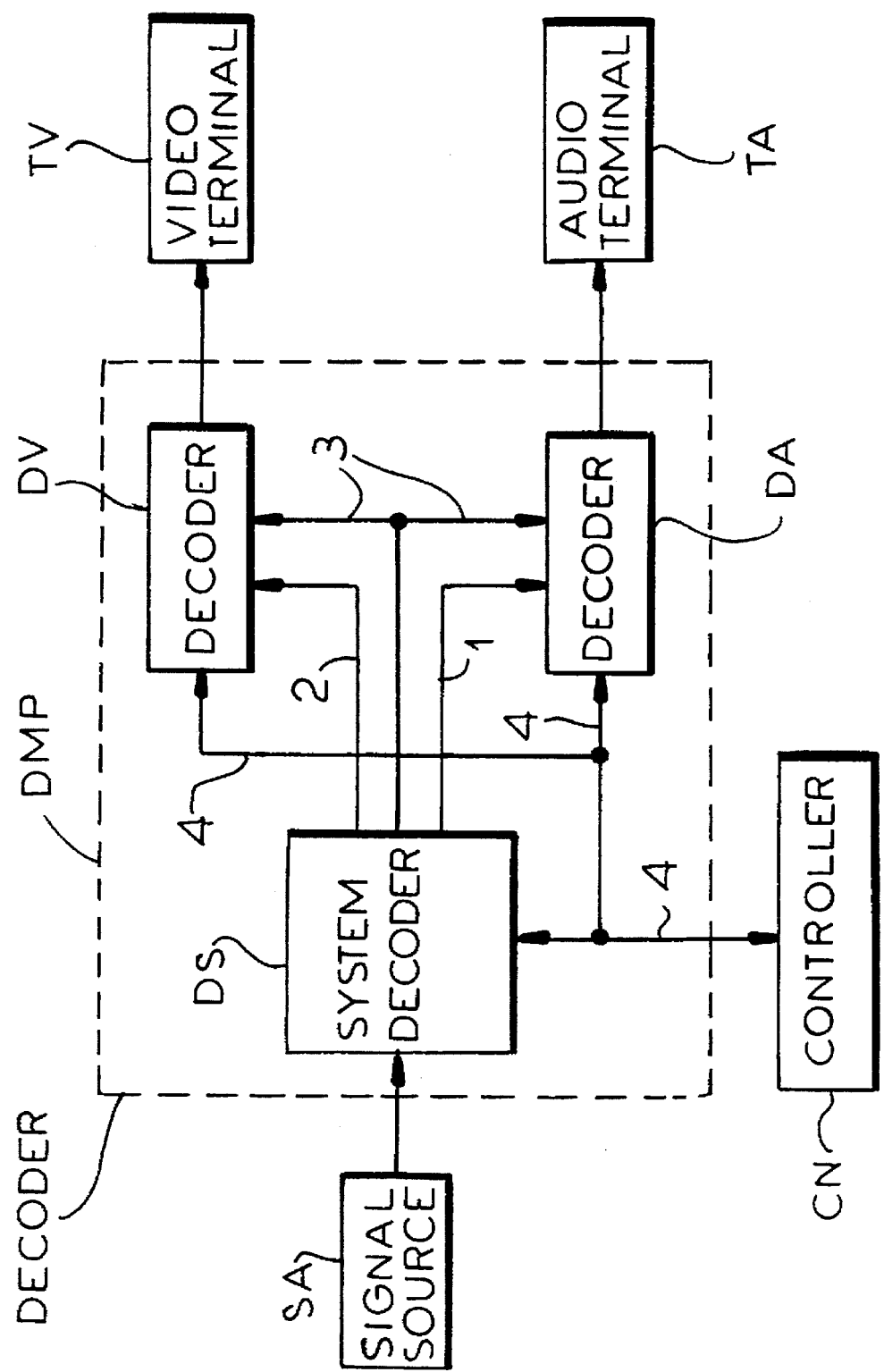
FIG. 1 is a block diagram of an MPEG decoder.

As can be seen in FIG. 1, a decoder DMP for decoding audio-visual stream encoded in accordance with the MPEG standard comprises, in principle, a system decoder DS, which receives these streams from a source SA (for instance a remote encoder) and demultiplexes them into the audio and video streams which are sent, still in coded form, to respective decoders DA, DV, as represented schematically by connections 1, 2. System decoder DS supplies DA, DV with timing information as well, as represented by connection 3. Decoder DMP is associated with a controller CN which is to program and supervise the various components of DMP (connection 4) and can also carry out the functions of DS. For the sake of clarity, however, the drawing represents separate units for system decoding and component programming/supervision. The decoded streams are then sent to audio and video terminals TA, TV.

Audio decoder DA, which constitutes the subject matter of the present invention, is able to decode monophonic and stereophonic audio signals compressed in the formats prescribed by the so-called audio layers I and II of the standard. Decoder DA is an integrated-circuit component which receives the coded audio streams and configurations data through a parallel bus which advantageously, with regard to data, can be configured by the user as 8 bit or 16 bit bus; through the same bus, the decoder transmits state information to the controller. Decoded audio signals are emitted in PCM serial format at a number of sampling rates, in particular 32 kHz, 44.1 kHz and 48 kHz. In addition to carrying out decoding functions, DA also manages recovery from possible error situations in the data streams and it also manages the synchronism of the emitted audio signals with the associated video signals. Through a command word it is also possible to force a global reset of the device initial conditions.

Figure 2:
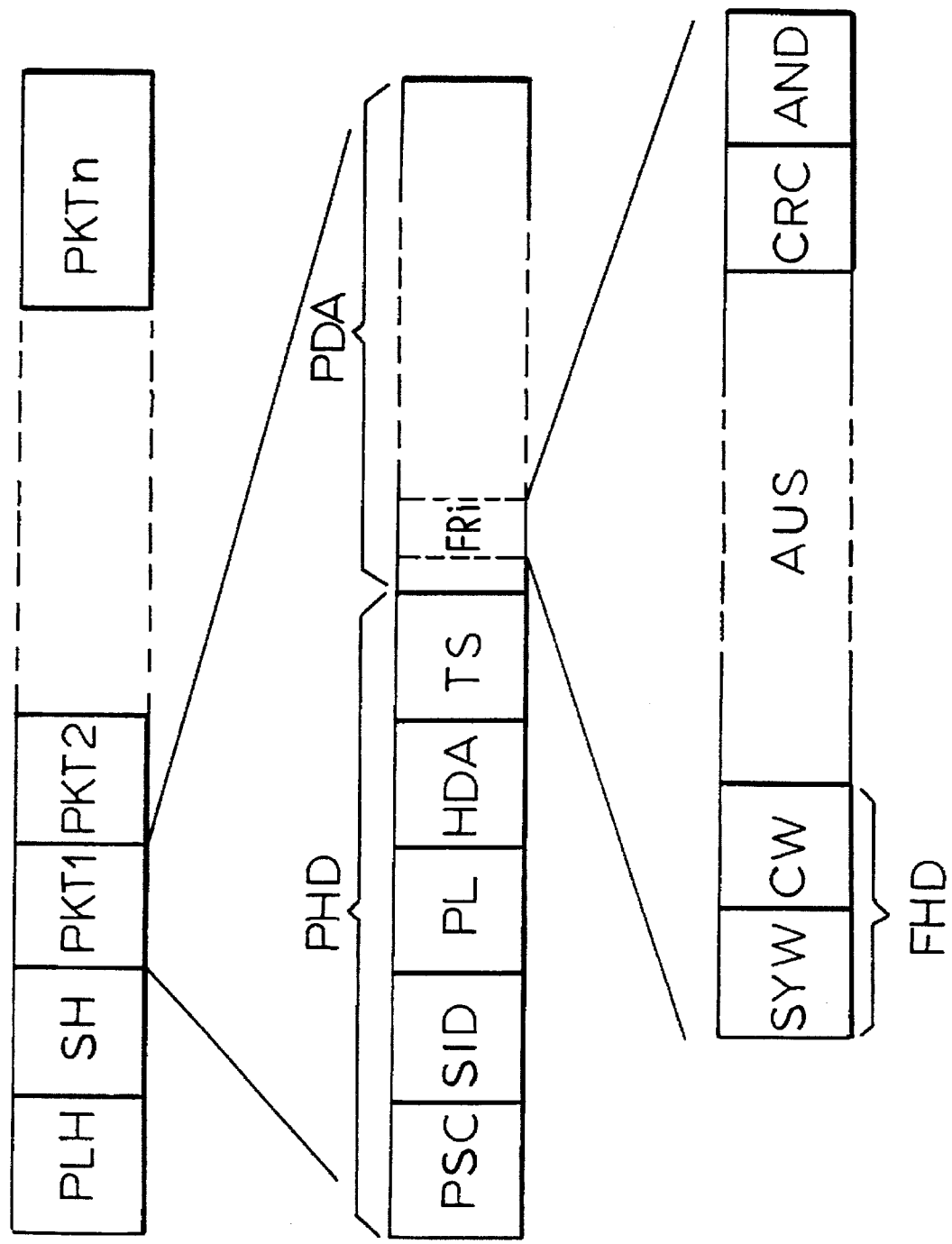
FIG. 2 is a diagram of the structure of the packets and the frames.
Figure 3:
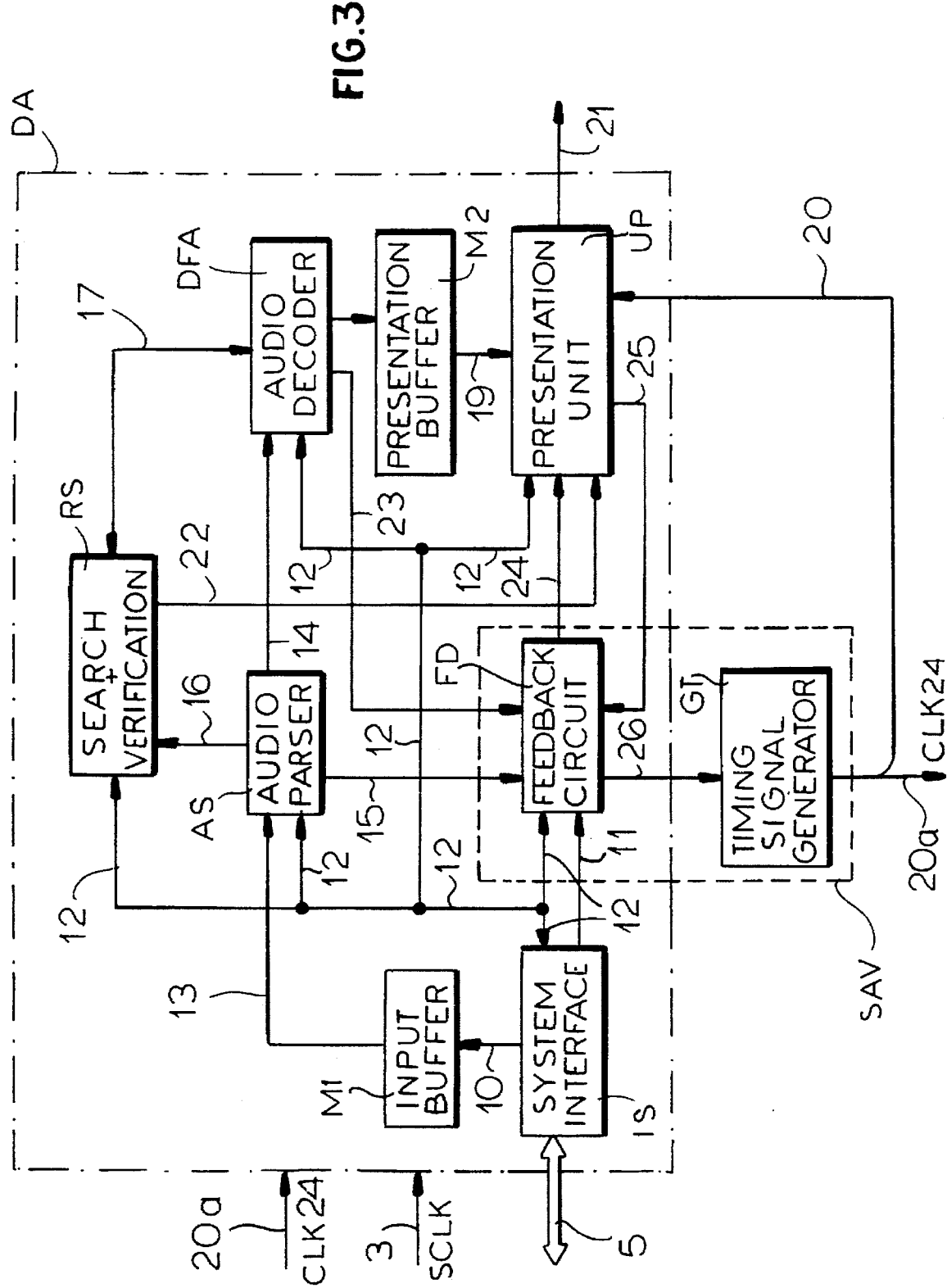
FIG. 3 is a functional block diagram of the audio decoder of the present invention.

The structure of DA is represented in greater detail in FIG. 3. To ease understanding of the invention, before describing that structure, the organization of an MPEG pack shall be briefly illustrated, with reference to FIG. 2.

An MPEG audio-visual packs comprises service information (here represented in the whole by a Pack Layer Header PLH and by a System Header SH, which is optional) and a sequence of packets PKT1, PKT2 . . . PKTn. As shown for PKT1, each packet is formed by a packet header PHD and by a certain number of data bytes PDA. Header PDH comprises, in case of audio packets:

3 bytes PSC constituting the packet start code, which is used to identify packet synchronism;

1 byte SID encoding the identity of the stream to which the packet belongs;

2 bytes PL encoding the packet length;

a variable number of bytes HDA, some of which are stuffing bytes used when the sampling rate is 44.1 kHz and possibly when the data are in free format (i.e. when the transmission occurs at a different bit rate from those defined by the standard and lower than a maximum rate admitted for the adopted coding modes) and others contain service information of no interest for the invention;

a group of bytes TS intended to contain possible timing indications, i.e.: no indication; the presentation time stamp PTS; or the presentation time stamp and the decoding time stamp DTS; the number of these byte depends on the indications transmitted; in the preferred realization of the invention, time stamp DTS, though present in the data stream, is not utilized.

The packet data bytes are in turn inserted into fixed-length frames (made up of 384 samples for the so-called coding layer 1 and of 1152 samples, i.e. 384×3, for coding layer II); only one frame, FRi, is indicated in the figure. The frames comprise:

a header (FHD) composed of a synchronism word SYW and of a control word CW specifying coding level, type of audio stream (stereo/mono), bit rate, sampling rate, emphasis (if any), tables for bit allocation to the subbands and information on scale factors;

audio samples AUS;

possibly, a word CRC for error detection and user-defined ancillary data AND, for example subtitles for the video part.

It must be specified that the organization into frames is independent of the organization into packets and that a frame can span successive packets. In this case, if TS (FIG. 2) contains a stamp PTS, the latter is related to the first frame starting in the packet.

FIG. 3 illustrates a functional block diagram of the decoder according to the invention. To keep the drawing simple, the various input/output signals of the component or the signals exchanged between the various units have not been indicated. Signals of interest for the invention shall become evident further on in the description.

Decoder DA is connected to bus 5 (which corresponds to the set of connections 1 and 4 in FIG. 1) through a system interface IS, which is a conventional microprocessor interface managing the dialogue of the device with the outside and the device programming. IS receives audio packets and synchronisation information (in particular, system clock signal SCLK) from DS (FIG. 1) and programming information from CN; IS also transfers information on the state of the other circuits in the decoder to controller CN. Dialogue with the outside through bus 5 occurs with the use of totally conventional protocols.

Through programming registers contained in IS, it is possible to control:

format of input and output data;

output data oversampling factor (data can be emitted in base band, i.e. without oversampling, or oversampled by a factor 2, 4, 8);

selection of the input audio data stream;

enabling/disabling audio data output;

parameters and data format of the circuits for managing audio-video synchronism, described further on.

IS can generate interrupt signals INTR in response to events signalled by the circuits in the device, in particular:

recognition of a PTS stamp in the incoming data flow;

synchronism errors;

starting the presentation of output data;

locking on to the incoming data stream synchronism;

impossibility of recovering phase shifts, or error conditions in the presentation unit and/or in the unit for synchronism search and verification.

Other information which can be accessed externally is:

the control word of the last decoded frame;

the value of the last PTS stamp extracted from the data stream;

indications on the state of some of the internal circuits.

Through a connection 10 IS supplies an input buffer memory M1 audio data to be decoded and, through a connection 11, it supplies device SAV, managing audio-video synchronism, with the so-called "system clock reference", SCR, which is computed by an internal counter controlled by the system clock signal SCLK and is used to generate and correct audio-video synchronization signals. Interface IS also provides the other units of the device with control signals, which do not require detailed discussion, and receives therefrom state information to be made available to the outside. Line 12 outlines the connections between IS and the other units of the device for the exchange of command signals or state information.

Memory M1 is to compensate any variation in input data rate and to supply data in the format determined by downstream units. Through a connection 13, memory M1 supplies audio data to an audio packet parser AS, which recognizes constructions belonging to the "audio packet" layer of the standard and extracts from them information of significance for the decoding process. In other words, AS must recognize the service bytes contained in the packet headers: since the configurations and the sequence of these bytes are defined by the standard, the structure of a logic network which carries out such recognition is implicitly defined by the standard and therefore a detailed description of AS is not necessary.

AS emits, on a connection 14, the "net" data (i.e. without service information), which are transferred downstream only after presentation time stamp PTS has been identified; until that moment, these data are discarded since no presentation time can be associated with them. Presentation time stamp PTS is also supplied to the circuits managing audio-video synchronism SAV (connection 15) and its presence is also signalled along the decoding chain, synchronously with the data to which it refers.

In the presence of events preventing correct recognition of the service byte sequence, for example errors in the packet structure or in the stream identifier, AS generates and sends to a synchronism search and verification circuit RS, through a connection 16, a signal which is utilised to stop emission of the output data stream.

The data are passed from AS to the audio stream decoder DFA which carries out operations required by the "audio" layer of the standard. In particular, in DFA the synchronism word present at the start of each audio frame is recognized; the frame header is decoded and information of relevance for the decoding process (control word, allocation tables, sample scale factor tables) is extracted from such header; if the header is protected, its integrity is checked; audio data contained in the frame are decompressed, re-quantified and re-scaled; then, the conversion from the frequency domain to the time domain and the windowing, prescribed by the standard, are carried out. Moreover, any ancillary data present in the frame after the audio data are discarded. For its operations, DFA is associated with a working memory, which is not represented.

Regarding decoding, it is not necessary to provide additional details, which can be found in the text of the standard and in particular in part 3 of the same (ISO/IEC 11172-3), where the flowcharts of the decoding operation are reported.

DFA provides the synchronism search and verification unit RS with information on the acquisition or loss of the frame synchronism (connection 17) and receives, in response, information governing the evolution of the decoding operations. Data decoded by DFA are supplied, through a connection 18, to a presentation buffer M2, for instance organised by pages, in a way which depends on the coding layer and on the type of audio stream. The data are transferred, through a connection 19, from M2 to a presentation unit UP which manages the serialisation and the presentation, through a connection 21, of the decoded audio samples. Serial data can be emitted in the "two's complement" or "offset binary" formats, in base band or oversampled by a factor 2, 4 or 8, depending on the component programming. Unit UP also produces a signal BCLK (discussed in connection with FIG. 8) with indicates the sampling instant of the output data. UP will emit mute frames wither in the presence, on connection 12, of a signal which IS derives from the programming information it contains (muting function), or in periods set by unit RS, which supplies the necessary information through a connection 22.

The synchronism search and verification unit RS manages the search for synchronism in the incoming data stream and its recovery in case of errors or interruptions in the stream. Based on information provided by AS and DFA, the correctness of the distance between successive synchronism words is checked. In case of free-format data, the unit also identifies the length of the frame used. Through system interface IS, the unit signals to the outside both the identification of the synchronism and any synchronism errors which may be present. The operations of RS shall be described in more details with reference to FIG. 7.

Audio-video synchronization managing unit SAV is to:
  start data presentation, by comparing the system clock reference SCR and the device internal time, evaluated indirectly through the instant of presentation of data which are associated with an indicator PTS supplied by AS; the start-of-presentation command is supplied to UP through wire 24;
  generate a timing signal (CLK24) for the different circuits in DA; such signal is supplied to said circuits through a wire 20a;
  control, through a suitable feedback circuit FD comprising a digital filter, the data presentation rate, in order to minimize the difference between SCR and the internal time; any discrepancy between SCR and internal time exceeding the operating range of the digital filter causes filtering to be suspended and it is signalled to the controller through IS; the presentation timing signals are supplied to UP through a connection 20, of which said wire 20a is part.

Maintaining presentation frequency and internal time locked to the corresponding system values guarantees synchronization between the audio data being emitted and the associated pictures. For its operations, SAV needs information contained in the control word CW, which information is supplied to SAV by DFA through connection 23.

Block SAV essentially consists of two parts: or feedback unit FD and units GT actually generating the timing signals; the latter units are outside the integrated circuit DA, enclosed within the dotted and dashed line. To keep the drawing simple, the wires and connections which bring signals SCLK and CLK24 end at the border of the integrated circuit, and they are not brought to all the units that utilise them. Again for the sake of simplicity, the signals for memory addressing and command are not indicated, since they are not of interest for the invention.

Figure 4:
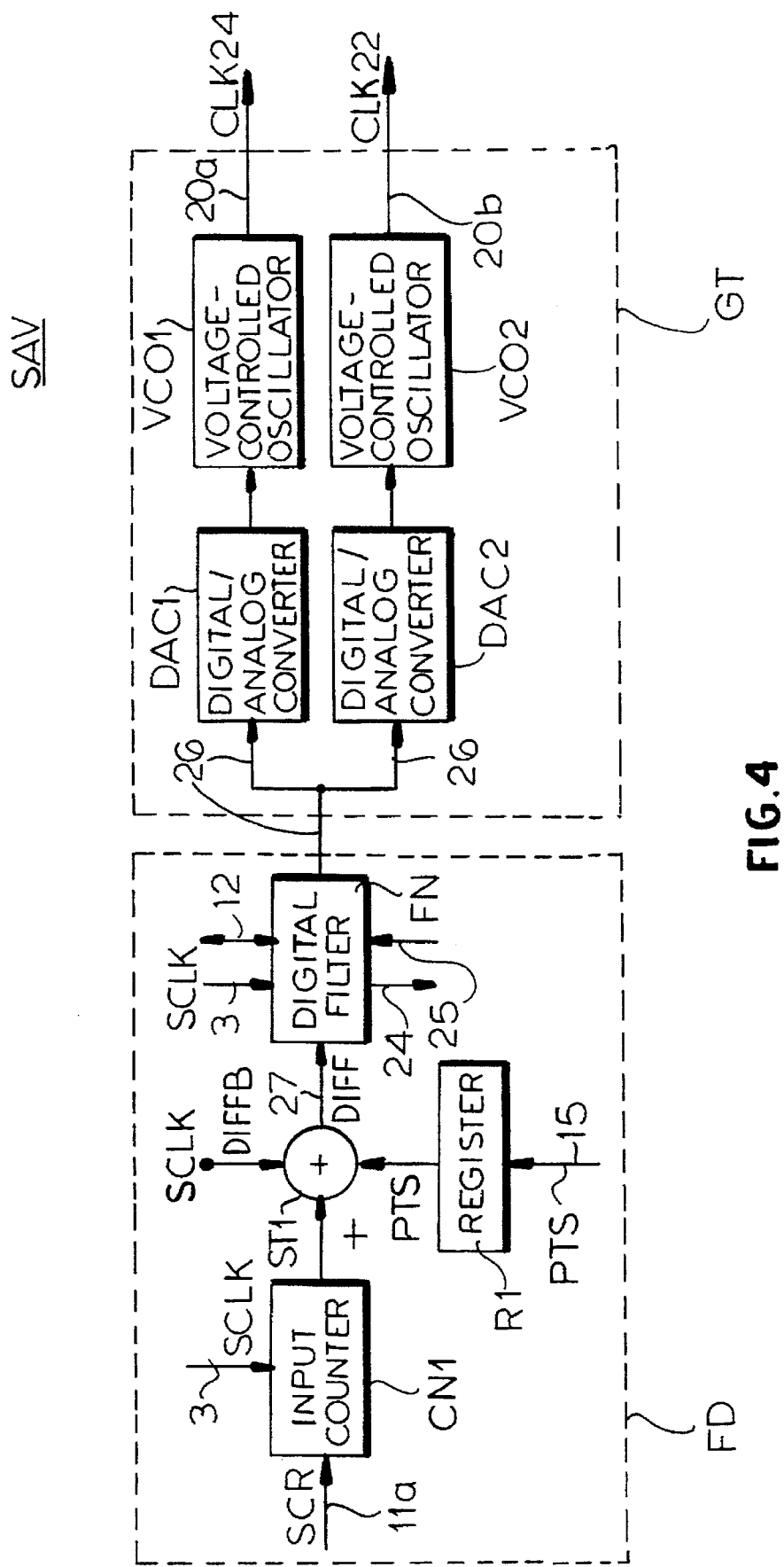
FIGS. 4, 5 are block diagrams of the circuit managing audio-video synchronisation.

The structure of block SAV shall now be described in further detail, with reference to FIGS. 4–6.

As previously stated, according to the standard the audio data can be sampled either at a first rate of 48 or 32 kHz (which in the invention is derived from a frequency of 24.576 MHz) or with a second rate of 44.1 kHz (derived from a frequency of 22.5958 MHz). Depending on the sampling rate utilised, data presentation is controlled by either of two clock signals CLK24, CLK22 which are generated by block GT, which is essentially a digital phase locked loop with a pair of digital-to-analog converters DAC1, DAC2 and a pair of voltage-controlled oscillators VCO1, VCO2 which generate the two signals CLK24, CLK22. Signal CLK24 also constitutes the timing signal for the other units in DA and therefore it is supplied to them irrespective of the output data sampling rate; however, check and correction of CLK24 by FD are carried out only if the output data sampling rate is 32 or 48 kHz.

This stated, an input counter CN1 counts, upon command of the system clock signal SCLK, signals SCR supplied by IS and supplies the value of the count to the positive input of a subtractor ST1, which subtracts from this value the value PTS of the presentation time stamp, supplied by parser AS (FIG. 3) through connection 15 and hold in a register R1. ST1 also receives at an additional subtraction input a signal DIFFB representing a fixed numeric value (in practice, a signal representing a unit value): that signal compensates the fact that the difference SCR–PTS is calculated with a delay of one period of SCLK, to enable the circuit to lock the various signals needed for operation, which arrive asynchronously, to SCLK. Output DIFF of ST1 is supplied, through a connection 27, to a digital filter FN, which is a filter whose zeros, poles, gain and output data format can be programmed through system interface IS (FIG. 3). If the difference SCR–PTS is within pre-set limits, filter FN generates, on output 24, the presentation start signal, and, on a group of wires of connection 26, a correction signal which, converted into an analog signal by either of two digital-to-analog converters DAC1, DAC2 depending on the chosen presentation frequency, is used to drive oscillator VCO1 or respectively VCO2. On another group of wires of connection 26, FN supplies the commands for selecting one of the converters. FN is enabled to emit the correction signal by the presentation unit UP, through connection 25, when UP recognises a time stamp PTS.

Note that, when the data presentation rate is 44.1 kHz and therefore signal CLK24 is not be corrected, converter DAC1 will continue to emit a value set in the course of the device initialization phase, for example the value corresponding to the central value of the emitted interval for the difference SCR–PTS (hereinafter referred to also as "central value of the filter band").

Figure 5:
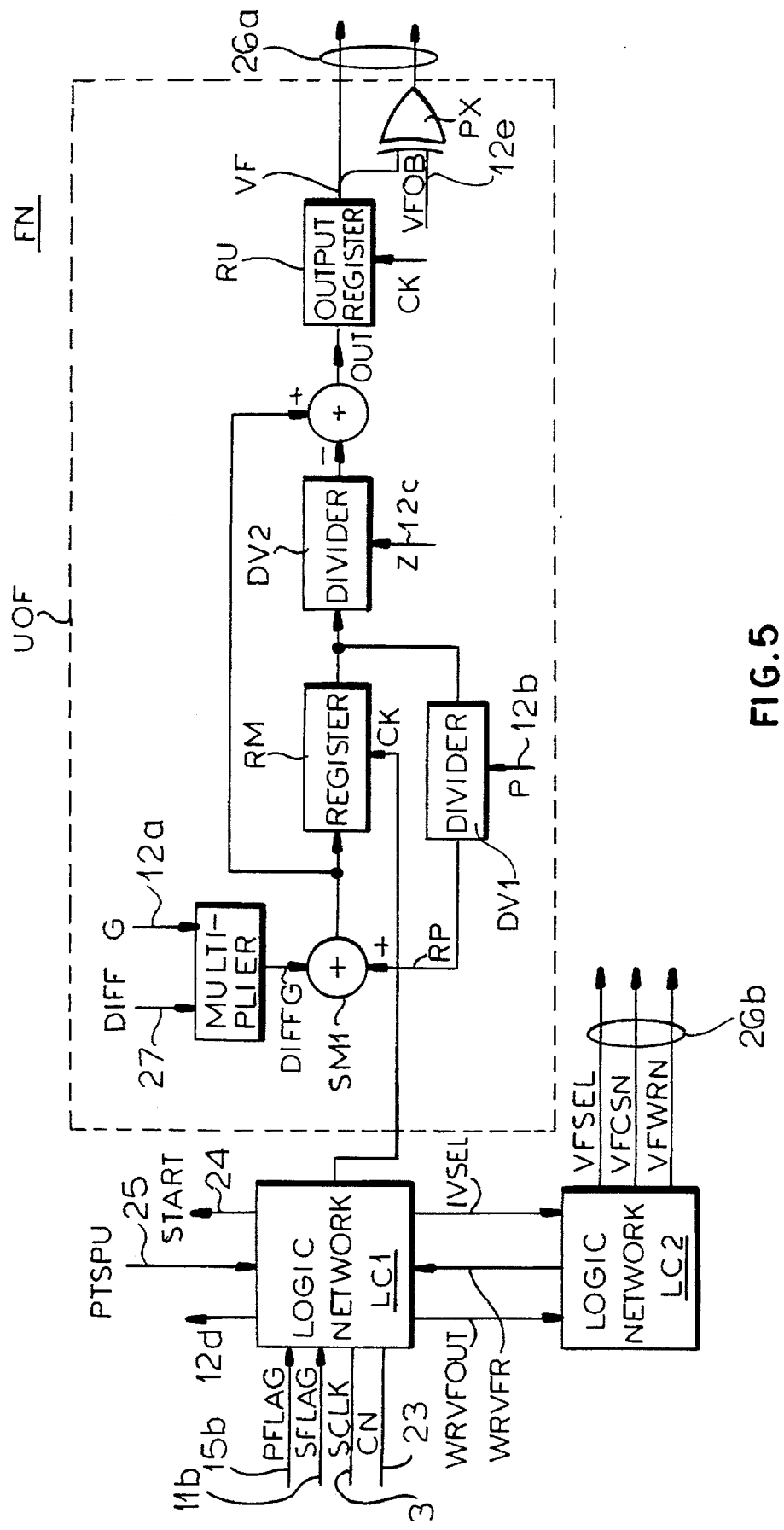

FIG. 5 shows that digital filter FN comprises an operating unit UOF (i.e. a unit which implements the filter transfer function), a logic network LC1 controlling the operating unit and a logic network LC2 for the management of external signals. Both logic networks are made up of a finite state machine.

Operating unit UOF comprises a multiplier ML1 which receives from ST1 (FIG. 4) the difference signal DIFF and multiplies it by gain G supplied through wires 12a of connection 12, giving a signal DIFFG. Gain G can have a limited number of discrete values (e.g. 2, 4, 8) and multiplier ML1 is advantageously implemented by means of a shifting combinatory logic. Signal DIFFG is added, in an adder SM1, to a signal RP which is the output signal of a divider DV1 which divides the output signal of the filter memory register RM by the value P of the pole (present on wires 12b of connection 12). The pole, too, can only have a limited number of discrete values, and divider DV1 also is advantageously implemented by means of a shifting combinatory logic. The output signal of RM is also divided, in a second divider DV2 analogous to DV1, by value Z of the filter zero, present on wires 12c. The output signal of DV2 is then substituted, in a subtractor ST2, from the output signal of SM1, giving filtered signal OUT.

The filtered signal OUT is stored in an output register RU which supplies, over wires 26a of connection 26, the value VF to be loaded into the involved converter DAC; the most significant bit of signal VF is combined, in an exclusive OR gate PX, with a signal VFOB which is supplied by the controller through interface IS and wires 12e and which indicates the data output format: offset binary format if VFOB=1, or two's complement, if VFOB=0. Moreover, during the initialisation phase, a value of VF corresponding to the central value of the filter band is set in the filter output register RU.

Loading commands for the memory register and the output register are represented by a signal CK, emitted by LC1. The precise time relations between the different events are not of interest for the invention.

Figure 6A:
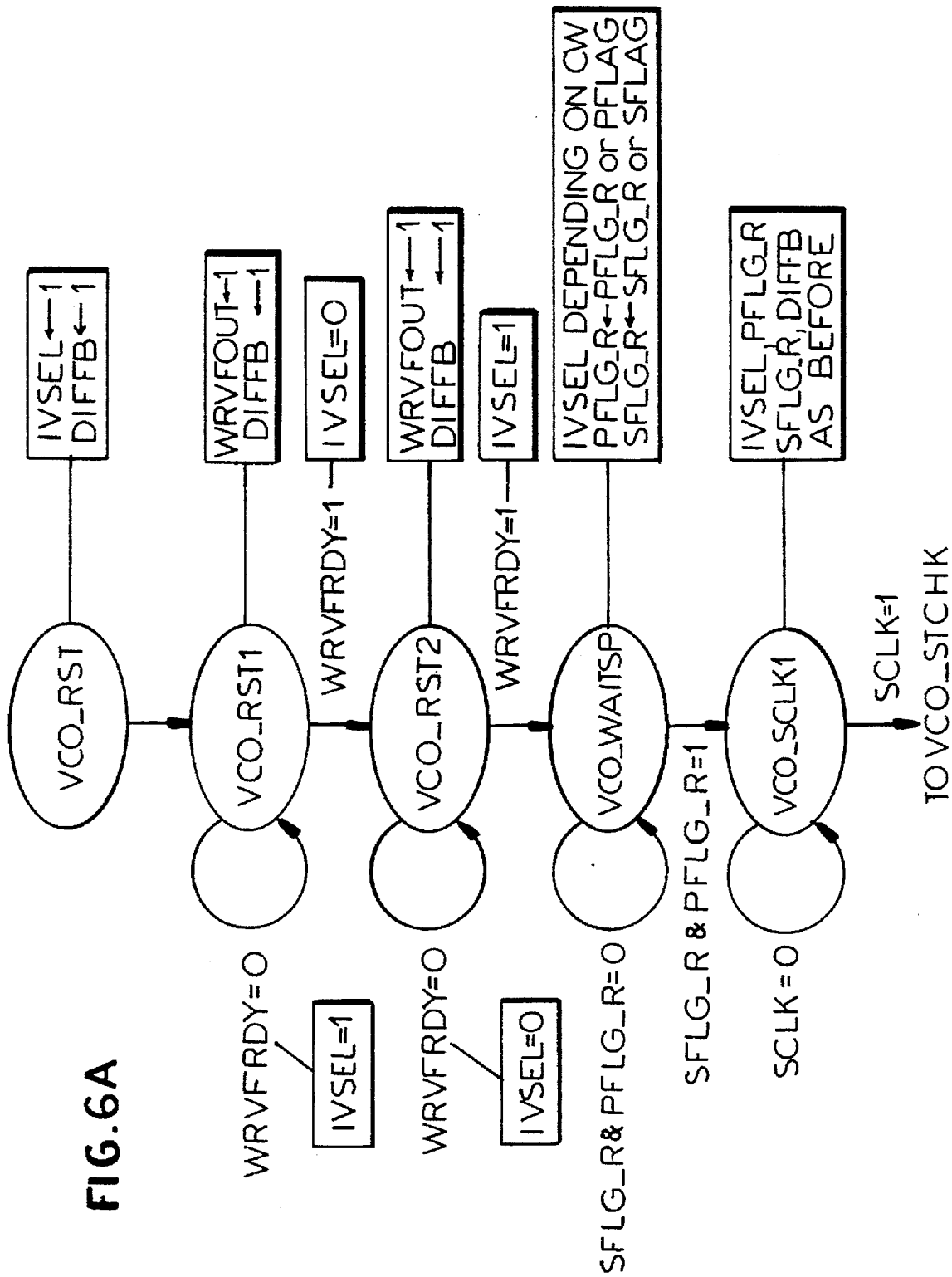
FIGS. 6A and 6B are a state diagram of a logic of the circuit for managing audio-video synchronism.
Figure 6B:
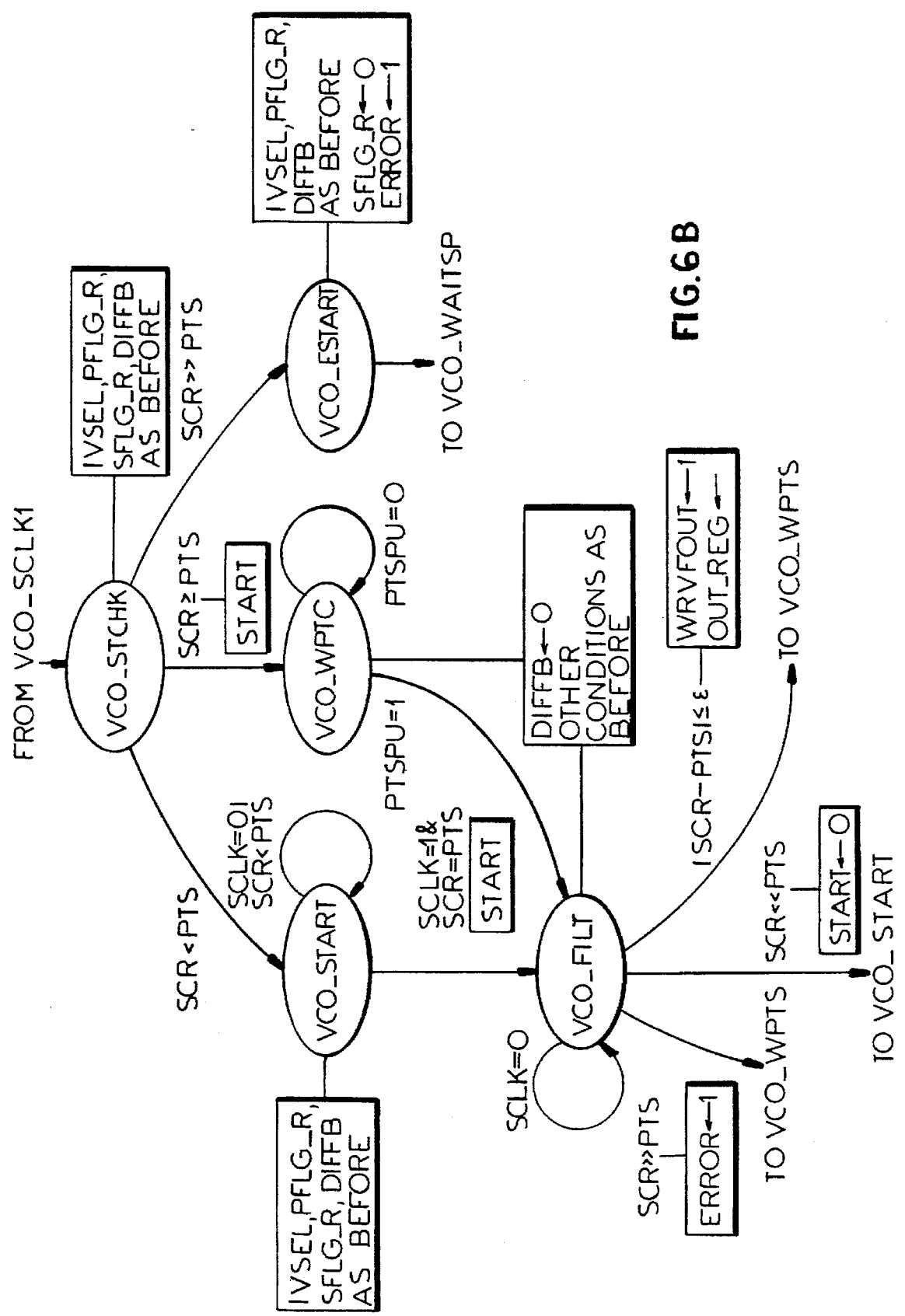

FIG. 6 represents the state diagram of LC1. In the filter working cycle, the following phases can be identified:
  resetting DAC1, DAC2 and VCO1, VCO2;
  waiting for timing references SCR, PTS;
  sychronizing with SCLK and checking that the difference between SCR and PTS lies within a pre-set interval;
  generating the presentation start signal (START);
  waiting for PTS from the presentation unit;
  actual filtering.

More in particular, in an initial state VCO_RST of the filter, logic network LC1 selects one of the converters and the corresponding oscillator (e.g. DAL1, VCO1, signal IVSEL=1), subtracts the value 1 from the difference between SCR and PTS (DIFFB=1) and goes to state VCO_RST1 where DAC1, VCO1 are reset. For the reset, LC1 asks LC2 (WRVFOUT=1) to write the central value of the filter band into the converter, which value is stored in RU (FIG. 5). LC1 remains in state VCO_RST1 until it receives from LC2 a signal confirming that reset has occurred (WRVFRDY=1), after which it goes to state VCO_RST2 (IVSEL=0) of reset of DAC2, VCO2. Operations carried out in VCO_RST2 are identical to those carried out in VOC_RST1. When the new confirmation arrives from LC2, LC1 goes to a state of wait for SCR, PTS (state VCO_WAITSP).

In this state, the converter and the oscillator corresponding to the desired sampling frequency (information contained in control word CW) are enabled by setting IVSEL to the appropriate value, and the arrival of flags indicating a valid SCR and a valid PTS (SFLAG, PFLAG) is awaited. These flags are supplied by the same units which supply SCR and PTS (thus by IS and AS) through wires 11b, 15b of connections 11, 15, and are stored in respective registers (SLFAG_R, PFLAG_R). When both a valid SCR and a valid PTS are recognized (SFLAG_R & PFLAG_R=1), LC1 passes to the phase of synchronisation with the system clock and verification of the difference between SCR and PTS.

In the first state of this phase (VCO_SCLK1), a pulse of SCLK is awaited and, when it arrives, a state VCO_STCHK is attained, where the difference between SCR and PTS is checked. For the system to function correctly the condition PTS-ε1≦SCR<PTS (condition indicated hereinafter as SCR<PTS) should be verified, but the filter is able to recover even situations in which PTS≦SCR≦PTS+ε2. If SCR>>PTS (i.e. if SCR-PTS>ε2), error state VCO_ESTART is attained, where, an error signal ERROR is sent to interface IS (FIG. 3) and SFLG_R is set to zero. Signal error is presented on wire 12d (FIG. 5) of connection 12. Error state is left due to an external intervention, for example the arrival of a new SCR.

If SCR<PTS or SCR≦PTS+ε2, the generation phase of signal START is entered. More particularly, if SCR<PTS, logic network LC1 goes into state VCO_START, which is a state of data presentation enabling, in which a preliminary synchronisation of presentation unit UP (FIG. 3) with the filter is carried out. Logic LC1 leaves this state when SCR=PTS and SCLK=1: the START signal for UP is generated and presented on output 24 (FIG. 5) and LC1 goes on to state VCO_FILT, which represents the normal filtering cycle: here, a filtering cycle is carried out, generally an idle one because no corrections are needed. Then LC1 moves to state VCO_WPTS, awaiting the next PTS. If PTS≦SCR≦PTS+ε2, signal START is immediately generated and LC1 moves directly to state VCO_WPTS. Here DIFFB is set to 0 and LC1, waits for UP to communicate that the moment to carry out filtering has come (PTSPU=1), i.e. waits for UP to supply a PTS signal through connection 25.

When this signal arrives, LC1 passes to state VCO_FILT, where three situations can occur:
a) the difference between SCR and PTS has a value lying within a range ε (ε=ε1+ε2) which can be recovered by the filter: filtering is carried out by loading the computed values DIFFG+RP, OUT into the memory register RM (FIG. 5 and respectively the output register of the filter and LC1 moves back to state VCO_WPTS;
b) if SCR<<PTS (i.e. SCR<PTS-ε1), the signal START is set to 0, thereby suspending presentation of the output data and LC1 returns to state VCO_START;
c) if SCR>>PTS, the error signal is generated and LC1 returns to waiting state VCO_WPTS.

Logic LC2 is essentially to emit on wires 26b (FIG. 5): a signal VFSEL for selecting converter DAC1 or DAC2, on the basis of command IVSEL supplied by LC1; a signal VFCSN to enable the converter; and a signal VFWRN to command loading, into the selected converter, value VF present on output 26a or register RU, on the basis of command WRVFOUT emitted by LC1. LC2 will also supply LC1 with a signal WRVFR upon conclusion of the operation. The realization of a logic network carrying out these operations is not a problem for the skilled in the art.

Figure 7:
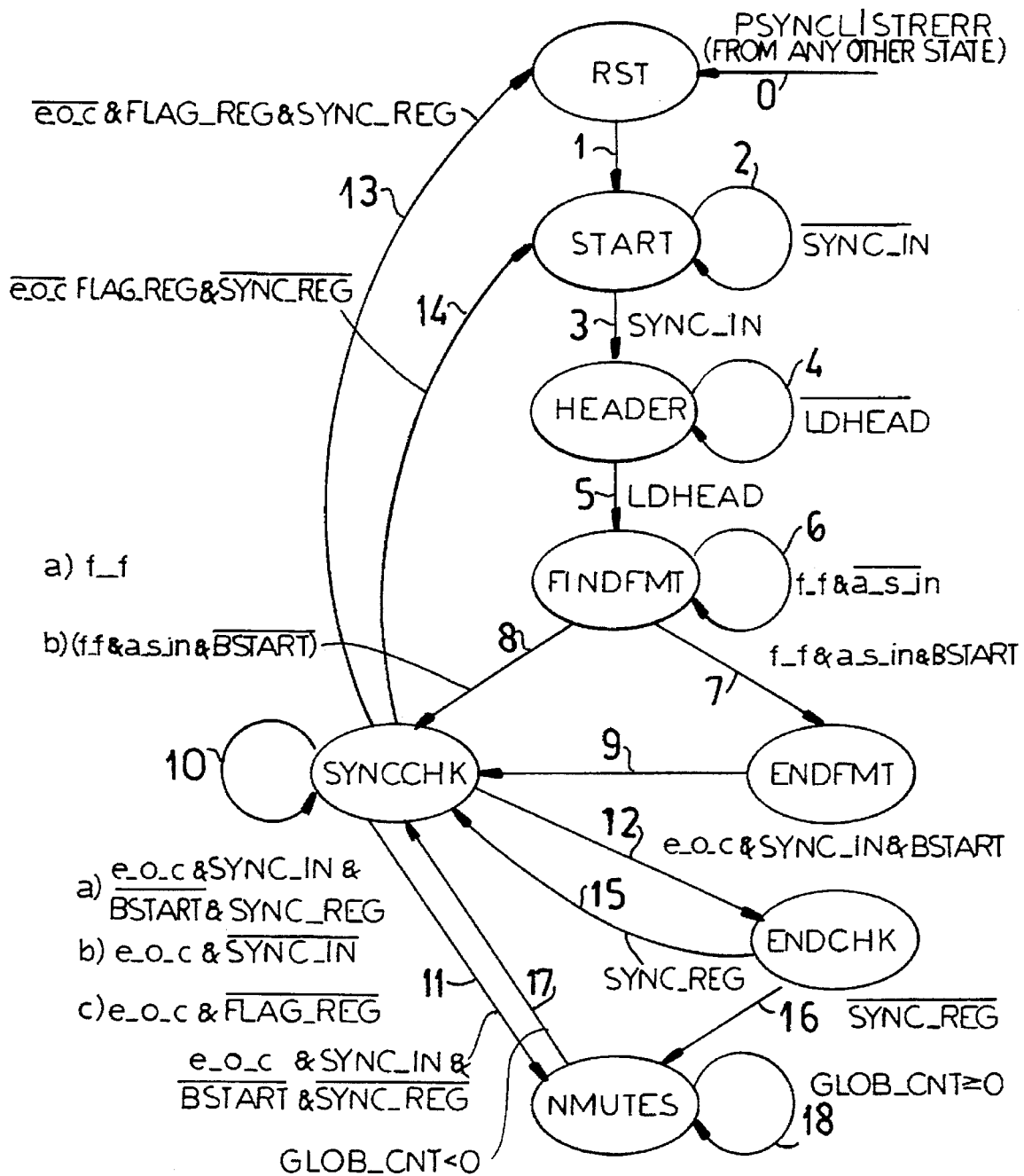
FIG. 7 is a state diagram of the circuit for synchronism search and verification.

FIG. 7 shows the state diagram of the synchronism search and verification unit RS. Given the diagram, the skilled in the art has no problem in realising the logic network which operates according to the same. For sake of clarity, the drawing shows only those conditions which determine certain transitions, while operations carried out in the various states or during the transitions are reported in Appendix I enclosed. There, like in Appendix II which shall be described further on, the transitions that do not bring about any action are not reported. In the diagram, as well as in the appendices, symbols !, &, | indicate logic conditions NOT, AND, OR respectively.

Unit RS is a logic network which manages a group of counters and is essentially to:
  determine the number of bytes contained in a frame being processed, in the case of free-format stream (in the case of fixed format, the number is written in each frame header);
  verify that the distance between two successive synchronism words is correct (i.e. verifying that synchronism has been reached and maintained);
  compute the number of frames elapsed between the start of the stream and synchronism lock-on (i.e. the number of frames which are not to be forwarded to the presentation unit).

Initial state RST is a state of reset of all registers and counters in RS. These are:
  BIT_REG=register which stores the count of the number of bits in a byte;
  BYTE_CNT=counter of the number of bytes in the frame;
  FLAG_REG=register which stores a flag indicating the end of count of the number of bytes;
  GLOB_CNT=counter of the number of words after a PTS;
  LDNMUTES_REG=register which stores a flag indicating the end of count of the number of bytes to be suppressed;

NBYTES_REG: register which stores the number of bytes in the frame;

NMUTES_REG: register which stores the count of the number of bytes to be suppressed;

SYNC_REG: register which stores a flag of synchronism identification;

SYNCLOST_REG: register which stores a synchronism loss flag.

Note that for all aforesaid registers/counters, except GLOB_CNT, reset consists in forcing a value 0, whilst for GLOB_CNT a negative value (e.g. −2) is forced to take into account the fact that a number of counting cycles is lost in the initial working phases of the machine and to cause the count to actually start after the arrival of stamps PTS.

State RST can be reached from all other states of the machine (transition 0) in case of error or loss of packet synchronism (signal PSYNCL) communicated by AS (FIG. 3). If this transition occurs, the synchronism loss flag is set to 1 and stored in SYNCLOST_REG.

From state RST, the machine moves on to state START, awaiting identification of the synchronism word (SYNC_IN). In this state, counter GLOB_CNT starts counting the bytes after PTS. If PTS arrives before a SYNC_IN, state START is related to this new PTS and therefore global counter GLOB_CNT is reset to value −2. This operation is also repeated in the subsequent states. When SYNC_IN arrives, the next state (HEADER) is attained where a valid frame header (signal LDHEAD supplied by DFA) is awaited. In the course of the transition (Transition 3), counter BYTE_CNT is reset and value NBITS of the bit count within the byte is stored in BIT_REG, in order to recognize synchronism at the bit level in the following frame. In state HEADER, counter GLOB_CNT is treated as before and in addition the bits BSTART, signalling the start of a byte to increase byte counter BYTE_CNT, are counted.

When LDHEAD arrives, RS leaves state HEADER and goes on to state FINDFMT where the frame format is examined. In the course of the transition, output HD_DEC_LOGIC(CW) of a decoding logic of control word CW, is loaded into register NBYTES_REG: such output is a number indicating a free format frame (f_f in the figure) if its value is 0 and corresponding the number of bytes in the frame if its value is different from 0.

RS leaves state FINDFMT, moving on to synchronism check state SYNCCHK, if the frame is a fixed frame (f_) or, in the case of a free format frame, when the frame length has been identified, i.e. when synchronism lock-on has been attained at the bit level, which is indicated in the Figure by a_s_in (transitions 8). In the case of free format frame, the value of BYTE_CNT less than the number of padding bytes PADBYTES is loaded into NBYTES_REG and BYTE_CNT is set to zero. If a bit BSTART arrives, state ENDFMT can be reached, because this bit is to be counted only in the subsequent frame. In the course of this transition, too, the aforesaid operations, related to BYTE_CNT, are carried out. In state ENDFMT, counter BYTE_CNT is increased.

State SYNCCHK is the normal working state of the logic. In this state, the end of the count of the bytes in the frame (e_o_c) is awaited, together with the arrival of the next frame synchronism byte (signal SYNC_IN supplied by DFA). Upon the arrival of e_o_c, a value 1 is loaded into a register (FLAG_REG) just tasked with storing such an event. When both e_o_c and SYNC_IN have arrived, synchronism lock-on for the current frame (SYNCOUT=1) is indicated. If this is the first lock-on, RS passes to state NMUTES, where the number of mute frames to be emitted is determined and is signal to the presentation unit (connection 22 in FIG. 3). This number is obviously given by the value counted by GLOB_CNT divided by the number of bytes in the frame. If it is not the first lock-on (SYNC_REG=1), the machine remains in state SYNCCHK (transition 10a).

If a bit BSTART arrives while the logic is cycling in state SYNCCHK, state ENDCHK is reached, which is left without any condition.

If the end-of-count has arrived, but SYNC_IN has not, this can mean that the upstream unit which supplies the data is busy: the machine remains in state SYNCCHK (transition 10b). This state is left either because the first SYNC_IN arrives (passage to NMUTES) or because SYNC_IN has not arrived, but a new byte (e_o_c) has. If this second case occurs, then synchronism has been lost: if in the previous frames synchronism lock-on had already been attained, the machine moves on to state RST, storing the event in register SYNCLOST_REG, otherwise it moves on to state START.

Figure 8:
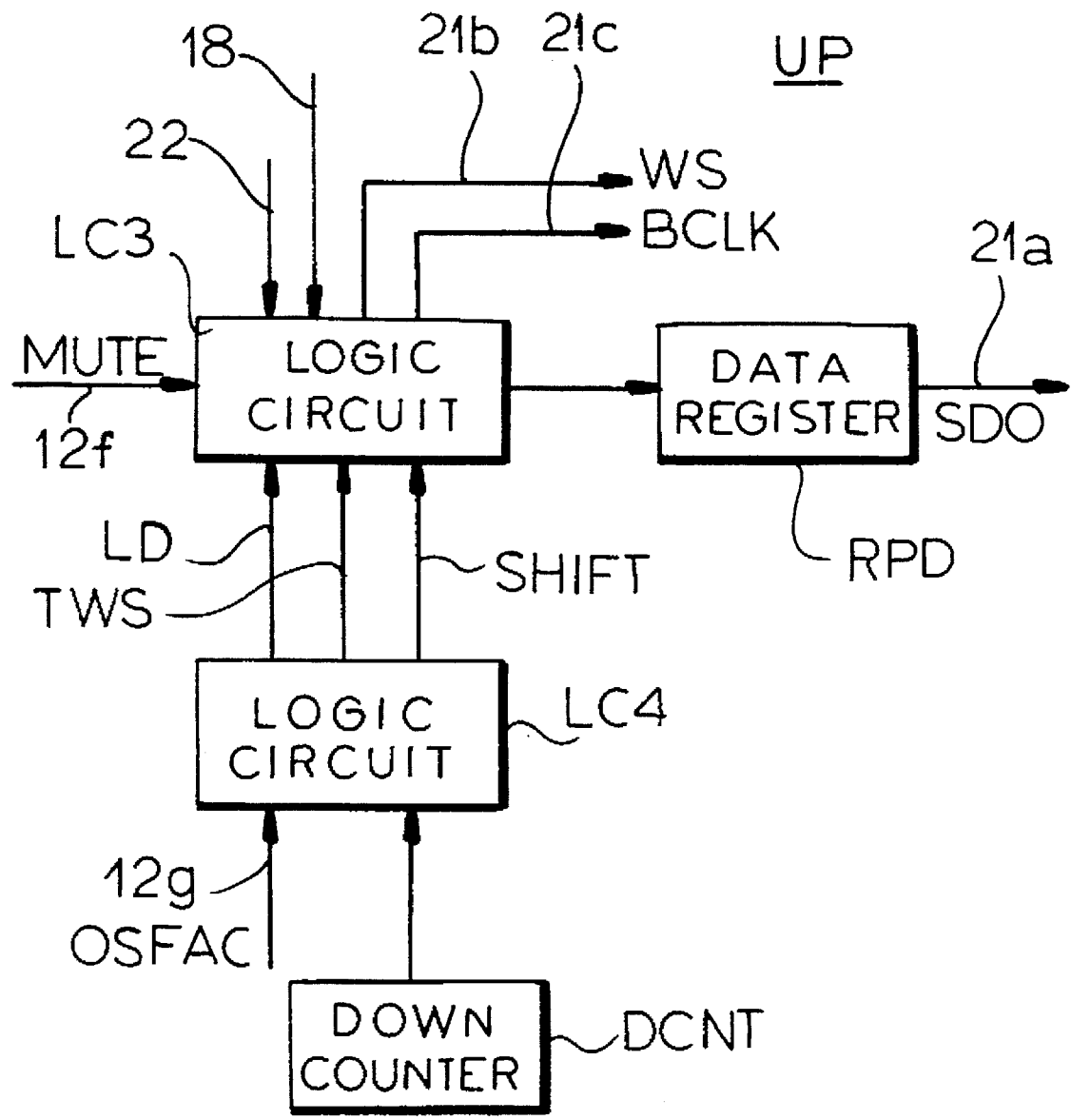
FIG. 8 is a block diagram of the presentation unit.

FIG. 8 depicts the structure of presentation unit UP (FIG. 3). This comprises: a data presentation register RPD, for the serial emission of output data; a logic network LC3 managing the unit and a logic network LC4 generating control signals for LC3. The operations of the circuits in UP are timed by signal CLK22 or CLK24, depending on data sampling rate.

Register RPD is a shift register (e.g. with 16 positions, if data are emitted as 16 bit words) operating as a parallel-to-serial converter. Since a datum has to be presented in output only once, or 2, 4 or 8 times depending on the oversampling factor, the register shall advantageously be of the cyclical type, to avoid having to reload the datum each time.

Logic LC3 controls the data loading the RPD and their emission over wires 21a of connection 21 by RPD on the basis of the signals received from LC4; moreover, again on the basis of the signals received from LC4, it emits over a wire 21b the command WS to change channel at the end of each word emitted, and over a wire 21c the signal BCLK, representative of the correct instant in which output data are taken by downstream units. Instead of data, LC3 will command the emission of mute frames, composed for instance of the centre-range value, if the muting signal MUTE, supplied by IS through wires 12f of connection 12, is active, or for the number of frames determined by signal NMUTES present on connection 22.

Logic LC4 is to obtain, from the count value of a 7-bit down-counter DCNT, signals LD, SHIFT, TWS which allow the management network LC3 to command data loading and data shift in register RPD and the presentation channel switching. These signals are generated on the basis of the output data oversampling factor set during the programming phase (signal OSFAC, which is supplied by IS over wires 12g and which can take on the value of 1, 2, 4 or 8). In particular:

a) in the case of oversampling by a factor 8, wherein 128 bits are emitted (one every counting step of DCNT):

signal SHIFT is active throughout the counting cycle of DCNT (from 127 to 0);

commands TWS and LD are generated when DCNT has reached value 1, i.e. in correspondence with the next to the last bit (with reference to the output signals);

b) in case of oversampling by a factor 4, wherein 64 bits are emitted (one every other counting step of DCNT):

signal SHIFT is activated every other step of the count of DCNT;

command TWS is still generated in correspondence with the next to the last bit to be emitted, and therefore when DCNT has reached a value of 2;

command LD is generated when DCNT has reached a value 1.

The same principle is adopted in the case of oversampling factors 2 and 1: shifting shall occur every 4 (8) steps of the count of DCNT; TWS is emitted in correspondence with the next to the last bit (and therefore when DCNT counts 4 to 8 respectively) and LD is always generated when DCNT has reached a value of 1.

Figure 9A:
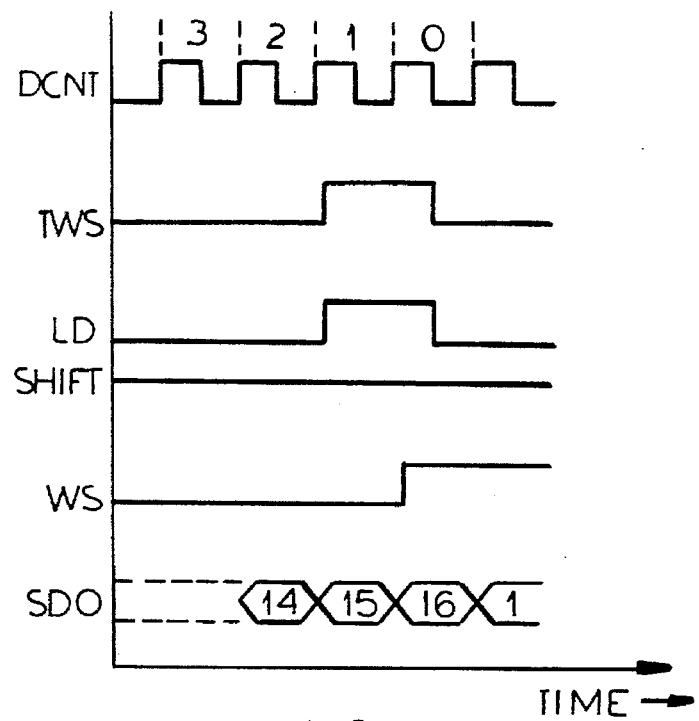
FIGS. 9A, 9B are time diagrams of some signals generated by the presentation unit.
Figure 9B:
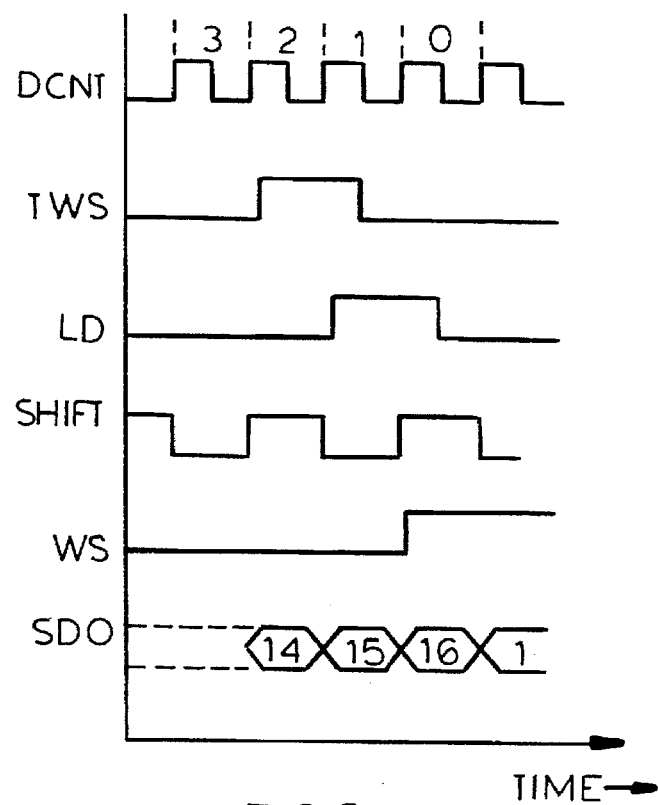

The signals emitted by LC4 in the case of oversampling factor 8 and 4 are also depicted in the diagrams in FIGS. 9A, 9B: for the sake of completeness, FIG. 9A also indicates signal WS and the bits outgoing from RPD.

The skilled worker in the art has no problem in realizing a logic operating in the aforesaid manner: it is evident that in practice, when the three more significant bits of the count of DCNT are 0, it shall be sufficient to carry out the AND operation between the value of OSFAC and the three least significant bits of the count of DCNT to generate LD, and the EX-OR operation between the value of OSFAC and the four least significant bits of the count of DCNT to generate TWS.

Management unit LC3 is a state machine presenting four working states: WAIT, MUTE, SKIP, ACTIVE, plus a loading state (WLOAD, MLOAD, SLOAD, LOAD) for each of them.

State WAIT is a state where the start of the presentation is awaited. In that state, unit UP emits mute signals corresponding with silence and awaits the arrival of a loading command LD. When the latter arrives, a check is made to see whether mute signals have been emitted on the two channels (signal CH) and whether the START signal has arrived. If both START and CH have arrived, the logic checks the availability of the number NMUTES of mute frames to be emitted to take into account the time elapsed to recognise PTS. This information is communicated by unit RS (FIG. 3) by means of a signal LDNMUTES transmitted on connection 22 which also carries value NMUTES to UP. If LDNMUTES is present and the number NMUTES is different from 0, the machine moves on to state MLOAD and then to state MUTE, which is the state where mute frames are emitted. The transition is carried out if data are present in memory M3 (FIG. 3). This is indicated by a signal DRGNT. If NMUTES is 0, the machine moves on to state WLOAD or LOAD depending on whether or not an external mute signal, MUTE, supplied by IS, is present (FIG. 3). If signal LDNMUTES is not present, the machine goes on (through SLOAD) to state SKIP which is similar to WAIT and which shall be examined further on in the description. The same transition is carried out if data are not available ($\overline{DRGNT}$).

In state MUTE, the emitted frames are counted backwards until NMUTES is equal to 0. From state MUTE, UP moves to state SKIP (through SLOAD) if no samples ($\overline{DRGNT}$) are available when emission of these frames is completed. If samples are available, the machine goes back to waiting state WAIT (through WLOAD) if an external muting signal MUTE is active, otherwise it moves on to state ACTIVE through state LOAD.

In state ACTIVE, signal samples are emitted by regularly alternating data loading and emission for the right and left channel, in case of stereophonic transmission, and loading and emitting the same datum on both channels for a monophonic transmission. If, in this state, a lack of data occurs, the machine moves on to state SKIP and, if signal MUTE becomes active, the machine moves to state WAIT, as has already been stated for state MUTE.

Finally, state SKIP is a synchronism-maintenance state, in which the machine goes if data to be forwarded is lacking. In this state, mute frames are emitted, taking into account, however, that each frame replaces a datum; therefore, when data becomes available, the number of frames to be emitted shall have to be reduced as a consequence.

The operation described above is also illustrated in Appendix II which reports the table of the states and the list of actions to be carried out for each state and transition. The state diagram has not been depicted graphically because, given the high number of possibilities of transitions from one state to another, it would have been practically incomprehensible. With reference to the appendix itself, some comments are appropriate to highlight correlations with FIG. 8 and to explain some actions. In particular:

the terms: DATASR; ROL(DATASR) respectively indicate register RPD and the cyclical bit shift within it;

RDYMUTES indicates the availability of the aforesaid value NMUTES;

SKIP_CNT indicates a counter of the number of samples used in state SKIP

SAMPLES_CNT indicates a down counter of the number of samples of a frame emitted on each channel. The reader is reminded that each frame comprises 384 samples for layer I (indicated by signal LAY12) and 1152 (i.e. 3×384) in layer II, and therefore the counter shall be initialised at value 383: taking this into account, the conditions related to LAY12 in transitions 5, 14, 19, 30 indicate that the blocks of 384 samples are counted twice for a stereo transmission and once for a monophonic transmission for layer I and respectively 6 and 3 times in case of layer II;

OB is the signal which indicates the format of output data (corresponding to VFOB in FIG. 5);

PTSF is a signal (associated to data supplied by M3, FIG. 3) which indicates that the datum emitted is associated to a PTS stamp and therefore that device SAV can start functioning.

It is evident that what has been described is provided solely by way of non-limiting example, and that variations and modifications are possible without departing from the scope of the invention.

APPENDIX I (OPERATIONS OF RS, see FIG. 7)

```
(0)      SYNCLOST_REG ← 1
RST      BIT_REG ← 0; BYTE_CNT ← 0;
         FLAG_REG ← 0; GLOB_CNT ← −2;
         LDNMUTES_REG ← 0; NBYTES_REG ← 0;
         NMUTES_REG ← 0; SYNC_REG ← 0;
         SYNCLOST_REG ← 0;
START:   if START ·PPPTS → GLOB_CNT ← −2; else if
         BSTART → GLOB_CNT ← GLOB_CNT + 1
(3)      BYTE_CNT ← 0; BIT_REG ← NBITS
HEADER:  SYNCOUT ← 1;
         if START ·PPPTS → GLOB_CNT ← −2; else if BSTART →
         GLOB_CNT ← GLOB_CNT + 1;
         if BSTART → BYTE_CNT ←
         BYTE_CNT + 1;
(5)      NBYTES ← HD_DEC_LOGIC(CW);
FINDFMT: if START ·PPPTS → GLOB_CNT → −2; else if
         BSTART → GLOB_CNT ← GLOB_CNT + 1;
         if BSTART → BYTE_CNT → BYTE_CNT + 1;
(7), (8b) NBYTES_REG ← BYTE_CNT − PADBYTES;
         BYTE_CNT ← 0
(8a)     f.f
ENDFMT:  BYTE_CNT ← BYTE_CNT + 1
SYNCCHK: if START ·PPPTS → GLOB_CNT ← −2; else if
         BSTART → GLOB_CNT ← GLOB_CNT + 1;
         else if e_o_c·SYNC_IN → GLOB_CNT ←
```

APPENDIX I-continued

(OPERATIONS OF RS, see FIG. 7)

```
            GLOB_CNT ← NBYTES_REG;
            if BSTART → BYTE_CNT ←
            BYTE_CNT + 1;
(10a; 12):  BYTE_CNT ← 0; FLAG_REG ← 0;
            SYNC_OUT ← 1
(10b):      FLAG_REG ← 1;
(11):       BYTE_CNT ← 0; FLAG_REG ← 0; SYNC_REG ← 1;
            SYNC_OUT ← 1;
(13):       FLAG_REG ← 0; SYNC_REG ← 0;
            SYNCLOST_REG ← 1;
(14):       FLAG_REG ← 0;
ENDCHK:     SYNC_REG ← 1; BYTE_CNT ← BYTE_CNT + 1;
(16):       GLOB_CNT ← GLOB_CNT - NBYTES_REG;
NMUTES:     if BSTART → BYTE_CNT ← BYTE_CNT + 1;
            GLOB_CNT ← GLOB_CNT - NBYTES_REG;
(17):       LDNMUTES_REG ← 1
(18):       LMUTES_REG ← NMUTES_REG + 1
```

APPENDIX II

A) TABLE OF STATES AND TRANSITIONS OF LC3 (FIG. 8)

| | STATE | FUTURE STATE | TRANSITION CONDITIONS |
|---|---|---|---|
| 1 | WAIT | WAIT | !LD |
| 2 | WAIT | SLOAD | LD & START & CH & LDNMUTES & (NMUTES = 0) & !DRGNT |
| 3 | WAIT | WLOAD | LD & START & CH & LDNMUTES & (NMUTES = 0) & DRGNT & MUTE |
| 4 | WAIT | LOAD | LD & START & CH & LDNMUTES & (NMUTES = 0) & DRGNT & !MUTE |
| 5 | WAIT | MLOAD | LD & START & CH & LDNMUTES & (NMUTES ≠ 0) |
| 6 | WAIT | SLOAD | LD & START & CH & !LDNMUTES |
| 7 | WAIT | WLOAD | LD & (!START!!CH) |
| 8 | MUTE | WLOAD | LD & (STEREO!CH) & !START |
| 9 | MUTE | SLOAD | LD & (STEREO!CH) & START & (NMUTES = 0) & !DRGNT |
| 10 | MUTE | WLOAD | LD & (STEREO!CH) & START & (NMUTES = 0) & DRGNT & MUTE |
| 11 | MUTE | LOAD | LD & (STEREO!CH) & START & (NMUTES= 0) & DRGNT & !MUTE |
| 12 | MUTE | MLOAD | LD & (STEREO!CH) & START & (NMUTES ≠ 0) |
| 13 | MUTE | MUTE | LD & !STEREO & !CH |
| 14 | MUTE | MUTE | !LD |
| 15 | SKIP | WLOAD | LD & CH & !START |
| 16 | SKIP | SLOAD | LD & CH & START & LDNMUTES & (NMUTES = 0) & !DRGNT |
| 17 | SKIP | WLOAD | LD & CH & START & LDNMUTES & (NMUTES = 0) & DRGNT & MUTE |
| 18 | SKIP | LOAD | LD & CH & START & LDNMUTES & (NMUTES = 0) & DRGNT & !MUTE |
| 19 | SKIP | MLOAD | LD & CH & START & LDNMUTES & (NMUTES ≠ 0) |
| 20 | SKIP | SLOAD | LD & CH & START & !LDNMUTES |
| 21 | SKIP | SLOAD | LD & !CH & STEREO |
| 22 | SKIP | SKIP | LD & !CH & !STEREO |

TABLE OF THE STATES OF LC3 (Follows)

| | STATE | FUTURE STATE | TRANSITION CONDITIONS |
|---|---|---|---|
| 23 | SKIP | SKIP | !LD |
| 24 | ACTIVE | SKIP | LD & (START!(STEREO & !CH)) & !DRGNT |
| 25 | ACTIVE | WLOAD | LD & ((START & CH)!(STEREO & !CH)) & DRGNT & MUTE |
| 26 | ACTIVE | LOAD | LD & ((START & CH)!(STEREO & !CH)) & DRGNT & !MUTE |
| 27 | ACTIVE | ACTIVE | LD & START & !STEREO & !CH & DRGNT |
| 28 | ACTIVE | WLOAD | LD & !START & (!STEREO!CH) |
| 29 | ACTIVE | ACTIVE | !LD |
| 30 | WLOAD | WAIT | |
| 31 | MLOAD | MUTE | |
| 32 | SLOAD | SKIP | |
| 33 | LOAD | ACTIVE | |
| 34 | RST | WAIT | |

APPENDIX II (Follows)

```
B) OPERATIONS OF LC3
WAIT    if SHIFT then DATASR ← ROL(DATASR);
        if (!LDNMUTES & RDYNMUTES) then LDNMUTES ← 1;
        NMUTES ← NMUTES_IN;
        if TWS then WS ← !WS;
        SKIP_CNT ← 0;
        DCNT ← DCNT - 1
2       CH ← !CH; ERROR ← 1
3       CH ← !CH; DREQ ← 1
4       CH ← !CH; DREQ ← 1
5       CH ← !CH; SAMPLES_CNT ← 383;
        if LAY12 then
            if STEREO then SGRP_CNT ← 1 else SGRP_CNT ← 0
        else
            if STEREO then SGRP_CNT ← 5 else SGRP_CNT ← 2
6       CH ← !CH
7       CH ← !CH
MUTE    if SHIFT then DATASR ← ROL(DATASR);
        if TWS then WS <← !WS;
        DCNT ← DCNT - 1
8       CH ← !CH
9       CH ← !CH; ERROR ← 1
10      CH ← !CH; DREQ ← 1
11      CH ← !CH; DREQ ← 1
12      CH ← !CH
13      CH ← !CH
14      if SKIP_CNT ≠ 0 then
            SKIP_CNT ← SKIP_CNT - 1;
            if SAMPLES_CNT = 0 then
                SAMPLES_CNT ← 383;
                if SGRP_CNT = 0 then
                    NMUTES ← NMUTES - 1;
                    if LAY12 then
                        if STEREO then SGRP_CNT ← 1 else
                        SGRP_CNT ← 0
                    else
                        if STEREO then SGRP_CNT ← 5 else
                        SGRP_CNT ← 2
                else SGRP_CNT ← SGRP_CNT - 1
            else SAMPLES_CNT ← SAMPLES_CNT - 1
SKIP    if SHIFT then DATASR ← ROL(DATASR);
        if (!LDNMUTES & RDYNMUTES) then LDNMUTES ← 1;
        NMUTES ← NMUTES_IN;
        if TWS then WS ← !WS;
        DCNT ← DCNT - 1
15      CH ← !CH
16      CH ← !CH; ERROR ← 1
17      CH ← !CH; ERROR ← 0; DREQ ← 1
18      CH ← !CH; ERROR ← 0; DREQ ← 1
19      CH ← !CH; ERROR ← 0; SAMPLES_CNT ← 383;
        if LAY12 then
            if STEREO then SGRP_CNT ← 1 else SGRP_CNT ← 0
        else
            if STEREO then SGRP_CNT ← 5 else SGRP_CNT ← 2
20      CH ← !CH;
21      CH ← !CH;
22      CH ← !CH;
ACTIVE  if SHIFT then DATASR ← ROL(DATASR);
        if TWS then WS ← !WS;
        DCNT ← DCNT - 1
24      CH ← !CH; ERROR ← 1
25      CH ← !CH; DREQ ← 1
26      CH ← !CH; DREQ ← 1
27      CH ← !CH
28      CH ← !CH
WLOAD   DATASR ← OB, "000000000000000"
        DCNT ← DCNT - 1
MLOAD   DATASR ← OB, "000000000000000";
```

APPENDIX II-continued

```
            DCNT ← DCNT - 1;
            if SAMPLES_CNT = 0 then
               SAMPLES_CNT ← 383;
               if SGRP_CNT = 0 then
                  NMUTES ← NMUTES - 1;
                  if LAY12 then
                         if STEREO then SGRP_CNT ← 1 else
                         SGRP_CNT ← 0
                         else
                               if STEREO then SGRP_CNT ← 5 else
                         SGRP_CNT ← 2
                     else SGRP_CNT ← SGRP_CNT - 1
               else SAMPLES_CNT ← SAMPLES_CNT - 1
SLOAD       DATASR ← OB "000000000000000";
            DCNT ← DCNT - 1;
            PTSF ← 0;
            SKIP ← SKIP + 1
LOAD        DATASR ← DATAIN exor (OB, "000000000000000");
            DCNT ← DCNT - 1;
            if PTSF then PTSF ← 0; PTSFOUT ← 1
RST         DATASR ← 0; CH ← 0; ERROR ← 0;
            DCNT ← 127; WS ← 0
```

We claim:

1. A decoder for audio signals belonging to audio-visual streams digitally coded in accordance with standard ISO/ IEC 11172, such audio signals being inserted into packets comprising a packet header with a first group of service words, and data words composed of audio signal samples inserted into frames comprising a pre-set number of audio samples and a frame header with a second group of service words, the decoder (DA) comprising:

interface means (IS) for receiving audio packets and programming and synchronization information from external units (DS, CN), which manage the system layer of the standard;

a parser (AS) of the audio packets, which receives the packets from the interface means (IS), recognizes the correctness of the configuration and of the sequence of the service words in the first group, and forwards the data contained in the packets to subsequent units when a presentation time stamp (PTS) for those data is recognized in the first group of service words;

means (DFA) for decoding the audio stream, which receive from the parser (AS) the content of the data words of the packets and decode it by exploiting the service words in the second group;

means (RS) for searching and checking the audio data synchronism, on the basis of information supplied by the parser (AS) and by the means (DFA) for decoding the audio stream;

a presentation unit (UP) for supplying the decoded data to digital-to-analog conversion means, data presentation being possible with different sampling rates which can be derived from at least a first and a second master frequency, the first master frequency being also utilized to generate an internal clock signal (CLK24) for the components of the decoder (DA); and means (SAV) managing audio-video synchronization, which are arranged to:
      start the presentation of the audio signals, by comparing a first timing signal (SCR), supplied by the interface means (IS) and representative of a system clock which also times decoding and presentation of the video signals, and a second timing signal (PTS), taken from the stream of audio samples and consisting of same presentation time stamp; and
      generate, independently, a first or a second clock signal (CLK24, CLK22) for the correct presentation of the audio signals with a sampling rate derived from the first or respectively from the second master frequency, and control these clock signals by using a feedback circuit which comprises a digital filter (FN) and operates in such a way as to minimize the difference between the first timing signal (SCR) and the second one (PTS), the first clock signal for the presentation of the audio signals coinciding with the internal clock signal of the decoder.

2. The decoder of claim 1 wherein said means (SAV) managing audiovideo synchronism can comprise:

means (ST1) for carrying out comparison between the first and the second timing signals (SCR, PTS) and for providing a signal (DIFF) representative of the difference between said signals;

said digital filter (FN), which is a low-pass filter whose poles, zeros and gain can be programmed through said interface means (IS) and which is arranged to filter the difference signal (DIFF) supplied by the comparison means (ST1), if the value of this signal is within a pre-set interval, and to supply an error signal, when enabled by the data presentation unit (UP); and a first and a second phase locked loop, comprising respectively a first and a second voltage-controlled oscillator (VCO1, VCO2), which are controlled by said error signal through respective digital-to-analog converters (DAV1, DAC2) and are arranged to generate and send to the presentation unit (UP), respectively the first or the second clock signal (CLK24, CLK22) for data presentation, depending on the required sampling rate.

3. The decoder of claim 1, wherein, in an initialization phase of the decoder (DA), the filter (FN) provides the converters (DAC1, DAC2) with an error signal corresponding to the central value of said pre-set interval.

4. The decoder of claim 1, wherein the presentation unit (UP) comprises:

a data presentation register (RPD) for the serial emission of the decoded samples on a decoder output;

a first logic network (LC3) for controlling sample loading and emission by said register (RPD) and for generating synchronism signals (BCLK) for sample reading by utilisation devices;

a second logic network (LC4) which generates and supplies to the first logic (LC3), on the basis of information on a data oversampling factor contained in the second group of service words, signals (LD, SHIFT, TWS) controlling data loading and shifting and the switching of the presentation channel, this second logic network (LC4) deriving said signals by processing the output signal of a counter (DCNT) whose counting capacity is equal to the capacity of said register (RP) multiplied by a maximum value of the oversampling factor.

* * * * *